(12) United States Patent
Colbert

(10) Patent No.: US 10,278,030 B2
(45) Date of Patent: *Apr. 30, 2019

(54) METHOD FOR CONFERENCE CALL PROMPTING FROM A LOCKED DEVICE

(71) Applicant: BLACKBERRY LIMITED, Waterloo (CA)

(72) Inventor: Michael Scott Colbert, Debary, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 468 days.

This patent is subject to a terminal disclaimer.

(21) Appl. No.: 14/049,100

(22) Filed: Oct. 8, 2013

(65) Prior Publication Data
US 2014/0045465 A1  Feb. 13, 2014

Related U.S. Application Data

(63) Continuation of application No. 13/069,845, filed on Mar. 23, 2011, now Pat. No. 8,583,097.

(51) Int. Cl.
*H04M 3/56* (2006.01)
*H04W 4/06* (2009.01)
(Continued)

(52) U.S. Cl.
CPC ........... *H04W 4/06* (2013.01); *H04L 12/1822* (2013.01); *H04L 65/1006* (2013.01);
(Continued)

(58) Field of Classification Search
USPC ....................................................... 455/416
See application file for complete search history.

(56) References Cited

U.S. PATENT DOCUMENTS 7,505,371 B2  3/2009  May et al.
7,793,225 B2  9/2010  Anzures et al.
(Continued)

FOREIGN PATENT DOCUMENTS

EP  0453089  10/1991
EP  1128641  8/2001
(Continued)

OTHER PUBLICATIONS

Windows Phone, Help and how-to basics (locked phone: things you can still do). http:www_microsoft_com.
(Continued)

*Primary Examiner* — Steven S Kelley
(74) *Attorney, Agent, or Firm* — Fish & Richardson P.C.

(57) ABSTRACT

A method for joining a conference call from a communication device, the communication device having a locked state and an unlocked state. The method includes displaying an interface on the communication device while the communication device is in the locked state, the interface including an option to join a scheduled conference call, receiving an input for selection of the option while the communication device is in the locked state, unlocking the communication device to the unlocked state, and sending a communication to a second communication device for establishing a conference call session.

18 Claims, 10 Drawing Sheets

(51) Int. Cl.
*H04W 4/16* (2009.01)
*H04L 12/18* (2006.01)
*H04L 29/06* (2006.01)
*H04M 1/725* (2006.01)
*H04W 12/06* (2009.01)

(52) U.S. Cl.
CPC ...... *H04L 65/1046* (2013.01); *H04L 65/1069* (2013.01); *H04M 1/72577* (2013.01); *H04M 3/56* (2013.01); *H04W 4/16* (2013.01); *H04L 65/4038* (2013.01); *H04W 12/06* (2013.01)

(56) References Cited

U.S. PATENT DOCUMENTS

| | | | |
|---|---|---|---|
| 8,275,411 B2 * | 9/2012 | Manzardo | H04L 12/12 370/352 |
| 8,378,782 B2 | 2/2013 | Orr | |
| 8,583,097 B2 | 11/2013 | Colbert | |
| 2005/0079896 A1 | 4/2005 | Kokko et al. | |
| 2005/0227680 A1 | 10/2005 | Snowden | |
| 2006/0035677 A1 | 2/2006 | Aerrabotu et al. | |
| 2006/0245566 A1 * | 11/2006 | Parker | H04M 3/56 379/202.01 |
| 2007/0037598 A1 * | 2/2007 | Ayyasamy | H04W 4/00 455/518 |
| 2007/0070940 A1 | 3/2007 | Vander Veen et al. | |
| 2007/0230282 A1 | 10/2007 | May et al. | |
| 2008/0168361 A1 | 7/2008 | Forstall et al. | |
| 2010/0162169 A1 | 6/2010 | Skarp | |
| 2010/0189238 A1 | 7/2010 | Gupta | |
| 2010/0225607 A1 | 9/2010 | Kim | |
| 2010/0248688 A1 | 9/2010 | Teng et al. | |
| 2010/0257490 A1 | 10/2010 | Lyon et al. | |
| 2011/0028186 A1 | 2/2011 | Lee et al. | |
| 2011/0076981 A1 | 3/2011 | Singh et al. | |
| 2011/0081889 A1 | 4/2011 | Gao et al. | |
| 2012/0046077 A1 | 2/2012 | Kim et al. | |
| 2012/0084734 A1 | 4/2012 | Wilairat | |
| 2012/0244836 A1 | 9/2012 | Colbert | |
| 2013/0077539 A1 * | 3/2013 | Averill | H04L 12/1818 370/261 |
| 2013/0150019 A1 | 6/2013 | Lee | |

FOREIGN PATENT DOCUMENTS

| | | |
|---|---|---|
| EP | 1715663 | 10/2006 |
| EP | 1973316 | 9/2008 |
| EP | 2285077 | 2/2011 |
| KR | 2002-0095948 | 12/2002 |
| WO | 2001/41458 | 6/2001 |
| WO | WO 2005/104512 | 11/2005 |

OTHER PUBLICATIONS

Google Groups, NitroDesk TouchDown, Calendar and Task reminders (http://groups.google.com/group/nitrodesk/browse_thread/thread/8c6fecc8242a101c).

Stack Overflow, "Push Notification Alert opens app when unlocking an iPhone" (http://web.archive.org/web/20101029051455/http://stackoverflow.com/questions/3927039/push-notification-alert-opens-app-when-unlocking-an-iphone).

Alerts—Installation and User Guide for Cisco Unified Mobile Communicator Release 7.0 for Nokia Phones (pp. 31-32).

Installation and User Guide for Cisco Unified Mobile Communicator Release 7.0 for Nokia Phones (http://www.cisco.com/en/US/docs/voice_ip_comm/cumc/7_0/english/symbian/installation_user_guide/whole_book.pdf), 2009, 48 pages.

PCT International Search Report and Written Opinion dated Nov. 10, 2011, issued in International Application No. PCT/CA2011/050151, (14 pages).

Extended European Search Report dated Aug. 24, 2012, issued in European Application No. 12154576.8, (8 pages).

Office Action dated Jun. 7, 2012, issued in U.S. Appl. No. 13/069,845, (19 pages).

Office Action dated Nov. 29, 2012, issued in U.S. Appl. No. 13/069,845, (14 pages).

Notice of Allowance dated Jul. 10, 2013, issued in U.S. Appl. No. 13/069,845, (18 pages).

Summons to Attend Oral Proceedings issued in European Application No. 12154576.8 on May 10, 2017.

Installation and User Guide for Cisco Unified Mobile Communicator Release 7.0 for Nokia Phones Alerts, pp. 31-32.

International Preliminary Report on Patentability in International Application No. PCT/CA2011/050151, dated Oct. 3, 2013, 6 pages.

Canadian Office Action in Canadian Application No. 2,768,789, dated Nov. 22, 2013, 2 pages.

\* cited by examiner

US 10,278,030 B2

METHOD FOR CONFERENCE CALL PROMPTING FROM A LOCKED DEVICE

CROSS REFERENCE TO RELATED APPLICATIONS

This application is a continuation of U.S. patent application Ser. No. 13/069,845, entitled "Method for Conference Call Prompting From A Locked Device," filed on Mar. 23, 2011, which is incorporated herein by reference in its entirety.

FIELD

Example embodiments relate to conference call systems and methods, and in particular to a method and communication device for joining a conference call.

BACKGROUND

During a conference call, voice or media connections are typically made between two or more communication devices such as telephones or mobile phones.

In some conventional devices, the user of a mobile device is himself responsible for keeping track of when to join a conference call. At the time of the conference call, the user typically first unlocks his mobile device, followed by dialing into the conference call. Further, additional functions and commands may also need to be performed onto the mobile device after unlocking in order to join the conference call.

Another difficulty is that unauthorized participants may attempt to join a conference call. The participants of a conference call are sometimes loosely defined wherein original invitees can forward invitations to others who can then participate. With only rudimentary security procedures such as a conference call dial-in number and access code almost anyone from any location can be a conference call participant, which could compromise security.

Other difficulties with existing teleconferencing systems will be apparent to those skilled in the art in view of the detailed description below.

BRIEF DESCRIPTION OF THE DRAWINGS

Reference will now be made, by way of example, to the accompanying drawings which show example embodiments, and in which.

Similar reference numerals may have been used in different figures to denote similar components.

DESCRIPTION OF EXAMPLE EMBODIMENTS

Figure 1:
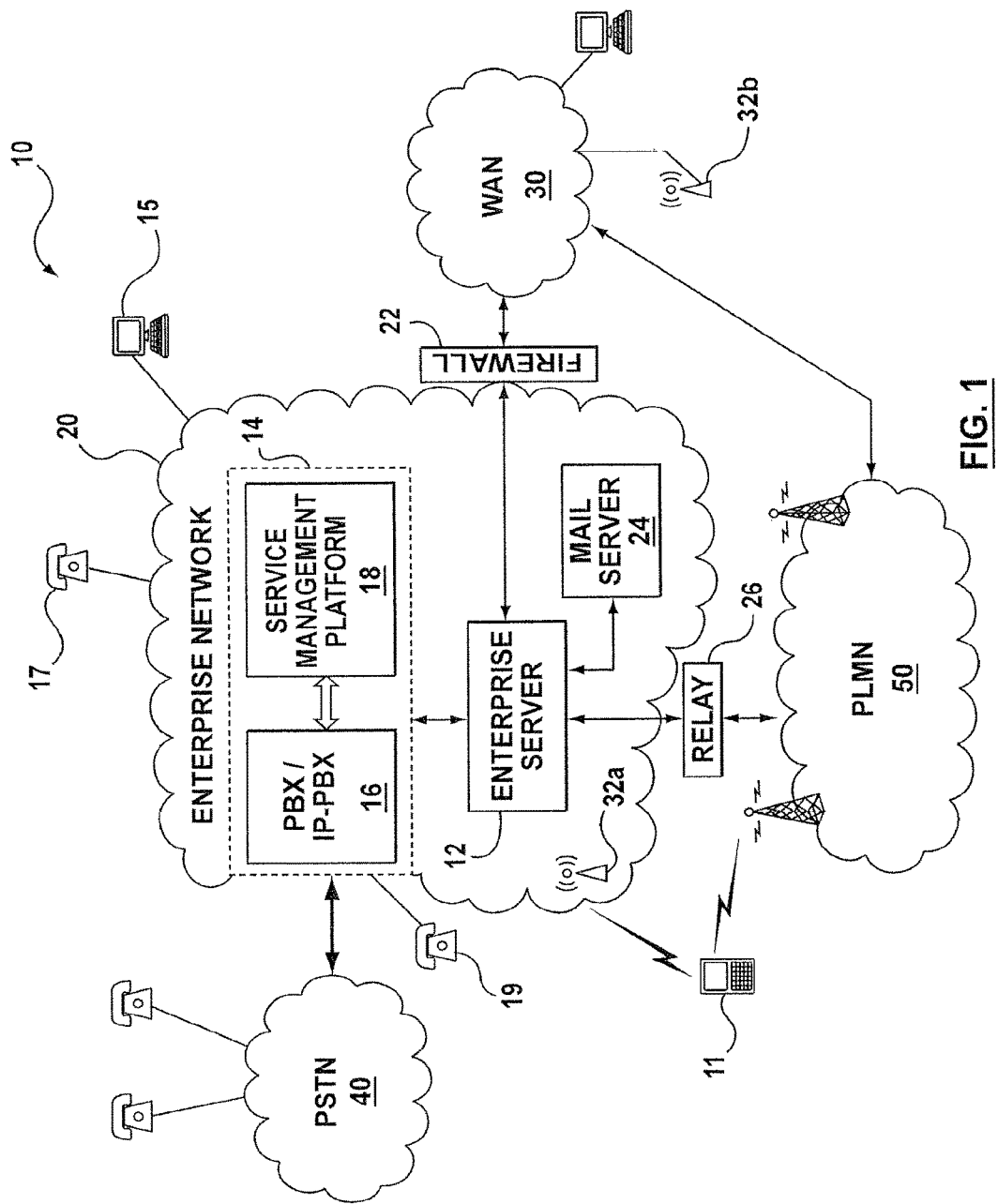
FIG. 1 shows, in block diagram form, an example system for managing enterprise-related mobile calls, including an enterprise communications platform, to which example embodiments may be applied.

Some example embodiments generally relate to conference call prompting from a locked device.

In some example embodiments, at or before the time of a conference call, a locked device may display a prompt that shows that a conference call is starting. This prompt may allow the user to join or snooze the scheduled conference call. If the user elects to join the conference call, the device may further require password entry to unlock the device. Once unlocked, the device may then contact a conference call server, for joining of the conference call.

In some further example embodiments, the client device may join a conference in a secure fashion so that only authenticated devices can join. This may provide a mechanism for a secure join. A unique identifier that is tied to a device, such as a device PIN (personal identification number) or mobile identifier may be used to authenticate the user.

In one aspect, there is provided a method for joining a conference call from a communication device, the communication device having a locked state and an unlocked state. The method includes displaying an interface on the communication device while the communication device is in the locked state, the interface including an option to join a scheduled conference call, receiving an input for selection of the option while the communication device is in the locked state, unlocking the communication device to the unlocked state, and sending a communication to a second communication device for establishing a conference call session.

In another aspect, there is provided a communication device including a controller configured for operating the communication device in a locked state or an unlocked state, a communications subsystem, a display for displaying an interface on the communication device while the communication device is in the locked state, the interface including an option to join a scheduled conference call, and an input device for receiving an input for selection of the option while the communication device is in the locked state. The controller is further configured for unlocking the communication device to the unlocked state, and sending a communication to a second communication device for establishing a conference call session.

In another aspect, there is provided a non-transitory computer readable medium having recorded thereon statements and instructions for execution by a communication device for joining a conference call, said statements and instructions comprising code means for performing the method.

Example embodiments relate to the control and management of conference call communications. Although reference may be made to "calls" and "talk" in the description of example embodiments below, it will be appreciated that some of the described systems and methods may be applicable to session-based communications in general and not limited to voice calls. Reference to calls may for example include shared data (e.g. presentation content) as well as media sessions which may for example include video and/or audio. The various communications may include both synchronous and asynchronous communications to implement such "calls".

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as understood in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped with communications modules for cellular communication through the PLMN 50, mobile devices equipped for Wi-Fi communications over one of the WLANs 32, or dual-mode devices capable of both cellular and data communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The mobile devices 11 may be various types of communication devices. Such mobile devices 11 may include "Class A" devices, which are able to function continuously as dual-mode devices, capable of both media and data communications. Mobile devices 11 may also include "non-Class A" devices, which may function as dual-mode devices for initialization or prior to connection with the enterprise communications platform 14, but may lose data functionality once a media session (e.g., voice call) is established. The enterprise network 20 may also include additional client devices which are voice-only or media-only devices, which may be digital or analog for communication with the PSTN or PLMN, and which may not have data capabilities (herein referred to as "voice-only" or "media-only" devices). In other embodiments, the mobile devices 11 may include any suitable client device configured with the communications functionality described herein, and may for example include computer devices, relays, proxies, gateways and any appropriate User Agents (as defined in SIP).

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Generally, the enterprise server 12 is configured to collectively serve the needs of the enterprise network 20, for example to provide and/or synchronize messaging, contacts and calendaring information between servers, desktop workstations 15, and mobile devices 11. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch eXchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response (IVR), call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
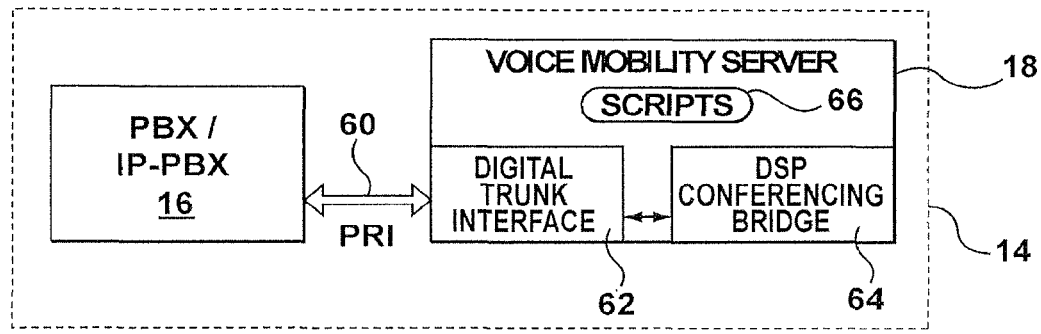
FIG. 2 shows, in block diagram form, further details of an embodiment of the enterprise communications platform.
Figure 3:
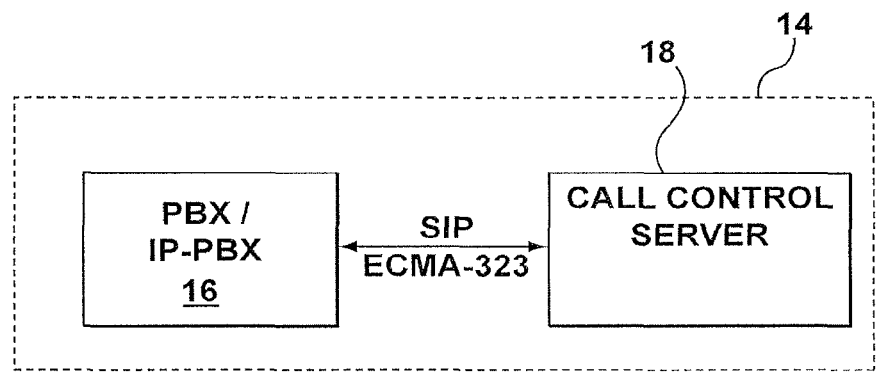
FIG. 3 shows another embodiment of the enterprise communications platform.
Figure 4:
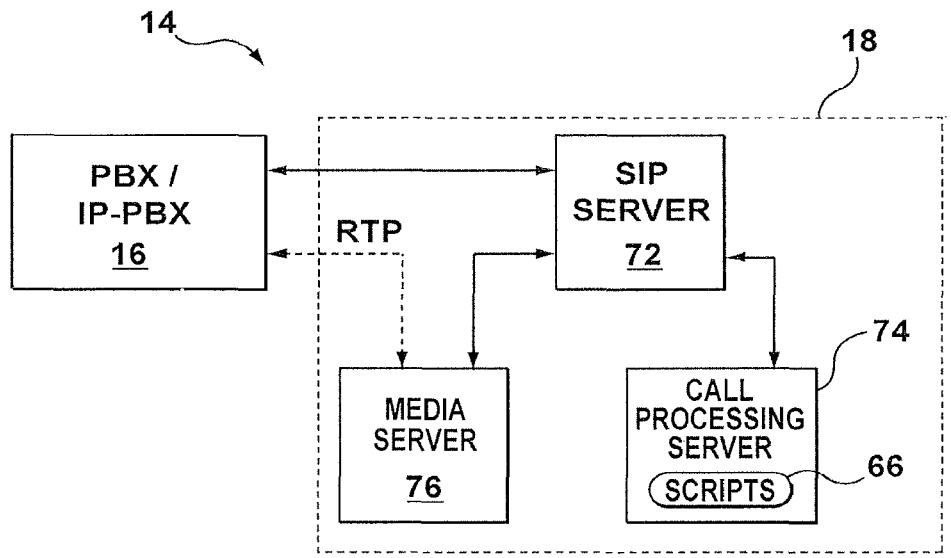
FIG. 4 shows yet another embodiment of the enterprise communications platform.

Reference is now made to FIGS. 2 to 4, which show example embodiments of the enterprise communications system 14. FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art. For example, in example embodiments the service management platform 18 may be separate from the PBX 16; or the service management platform 18 may include a cloud-based system.

Figure 5:
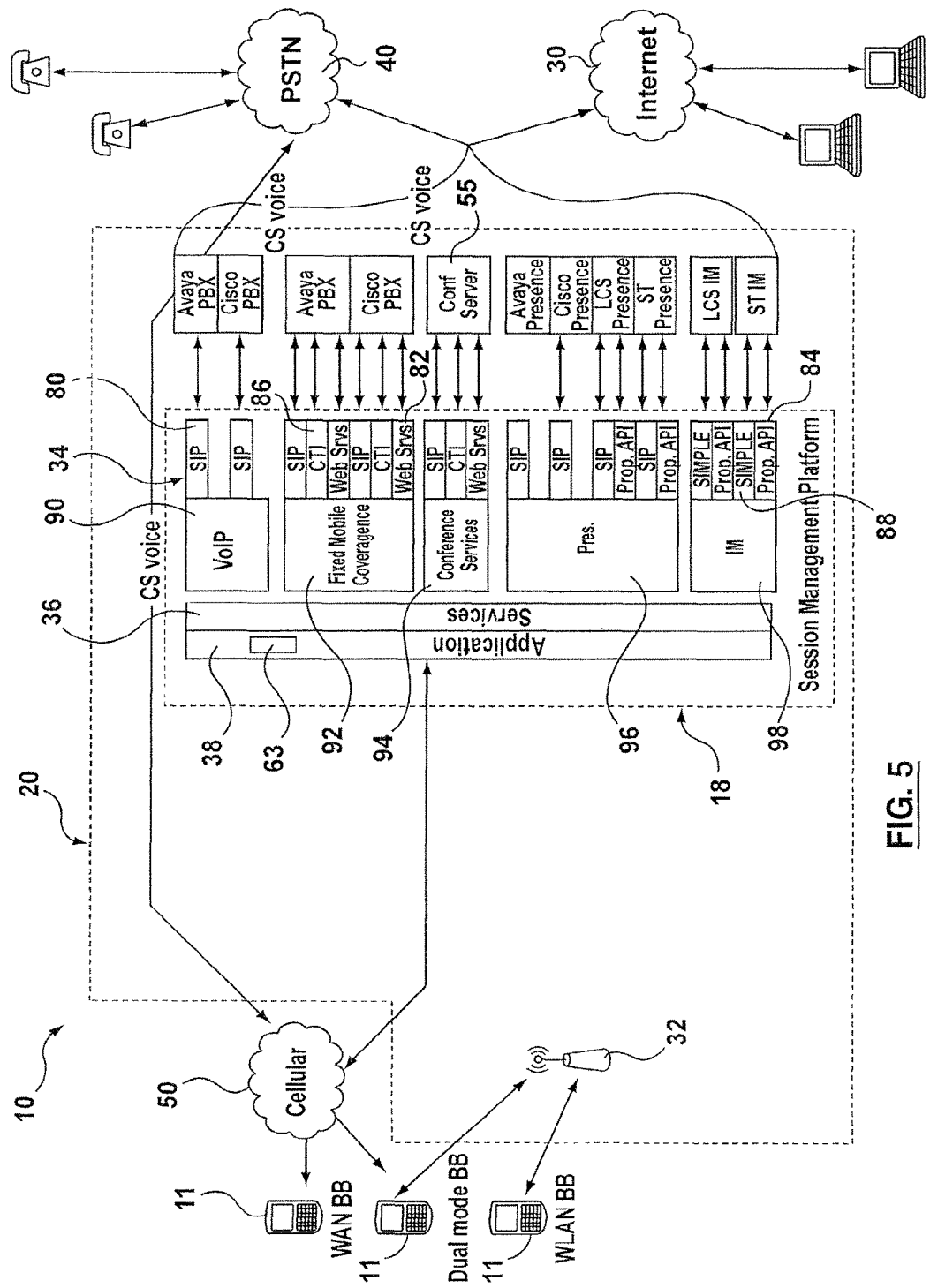
FIG. 5 shows further details of the enterprise communications platform of FIG. 3.

Reference is now made to FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

Although SIP 80 may be utilized, it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). SIP is defined in J. Rosenberg et al., "RFC 3261—Session Initiation Protocol" (June 2002), the contents of which are herein incorporated by reference.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Example conference call systems and methods in accordance with example embodiments will now be described, referring now to FIG. 6, which shows the system 10 when used or configured as a conference call system. As shown, the enterprise communications platform 14 includes the conference server 55 for providing conference call services for a number of client devices such as mobile devices 11, illustrated as one designated host device 11a and one or more participant devices 11b, 11c, 11d. The mobile devices 11 may collectively form a conference call group. The host device 11a is generally the mobile device 11 or associated user who schedules and hosts a conference call session, and may for example be permitted to perform such hosting functions as roll call, mute all, broadcast only, conference lock, etc.

In some example embodiments, during a conference call session, the enterprise communications platform 14 can receives Global Positioning System (GPS) information from at least some of the participant devices 11, and can send the received GPS information to the devices 11, to provide location based positioning services between the devices 11.

The enterprise communications platform 14 and the associated conference server 55 may be used for generally executing conference call functions. As described above, in example embodiments, the enterprise communications platform 14 may include or be coupled to the media server 76

(FIG. 4), wherein the enterprise communications platform 14 controls the media handling and media sessions of the media server 76.

Figure 6:
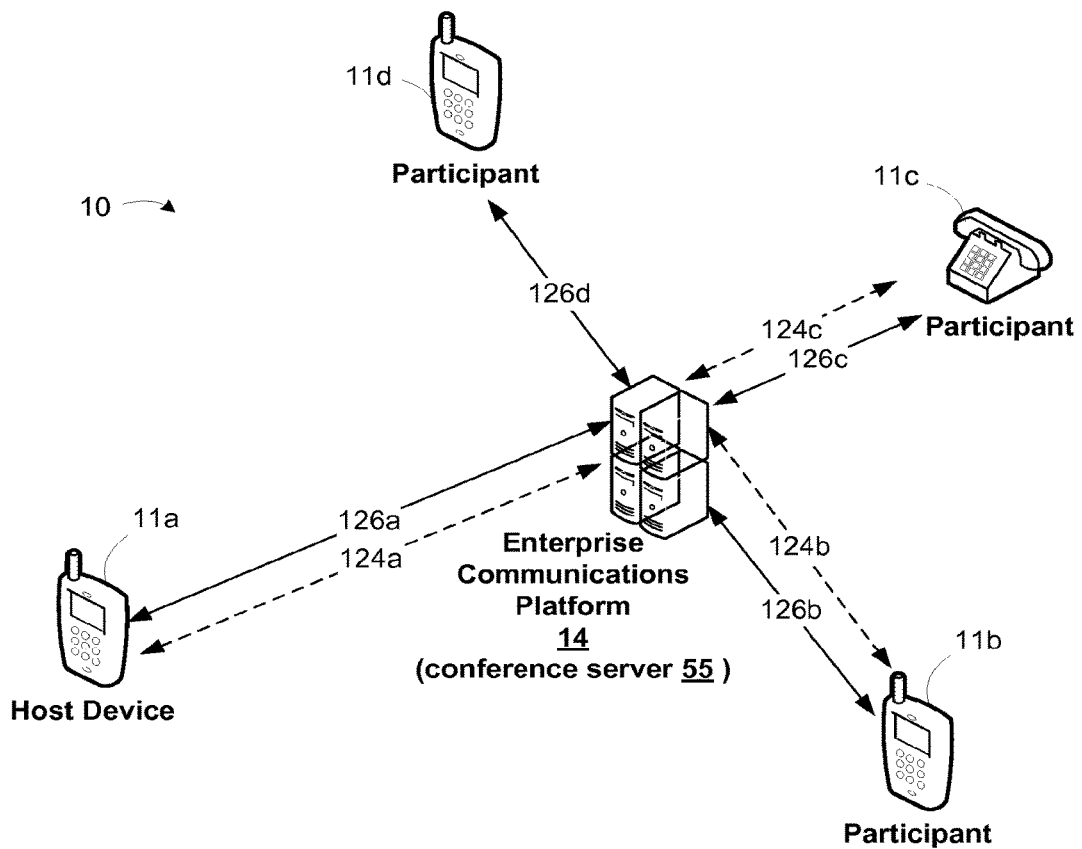
FIG. 6 shows, in block diagram form, a conference call system including the enterprise communications platform shown in FIG. 1 and client devices.

Referring still to FIG. 6, in order to implement some of the conference call functions described herein, the enterprise communications platform 14 may communicate with the mobile devices 11 by way of media sessions and/or control sessions. Specifically, as shown in FIG. 6, the mobile devices 11 communicates via media sessions 126 (shown as solid lines) and control sessions 124 (shown as dashed lines to distinguish from the media sessions 126). For example, the designated host device 11a communicates via media session 126a and control session 124a. Participant device 11b communicates via media session 126b and control session 124b. Participant device 11c communicates via media session 126c and control session 124c. In some embodiments, as shown, the participant device 11d may merely communicate via media session 126d over the PLMN 50 (FIG. 1) or PSTN 40 (FIG. 1) only (without an associated control session).

In some example embodiments, the media sessions may be facilitated by the enterprise communications platform 14 by way of Real-time Transport Protocol (RTP) media sessions, and may include voice calls, video calls, circuit-switched calls or VoIP calls. In order to generate or establish a conference call session, the enterprise communications platform 14 connects or links at least some of the call legs of each media session 126. The particular methods and processes for connecting of media sessions 126 into a conference call session would be understood by those skilled in the art, which may for example be implemented by media shuffling or SDP (Session Description Protocol) media shuffling, etc.

In some example embodiments, a data connection (e.g. the same data connection as used by the control sessions 124) can be further used to provide additional data sharing between mobile devices 11. For example, during a conference call, the host mobile device 11a may provide or transfer a data file to the remaining mobile devices 11. Data sharing may also include Web Services or sharing of presentation content.

Figure 7:
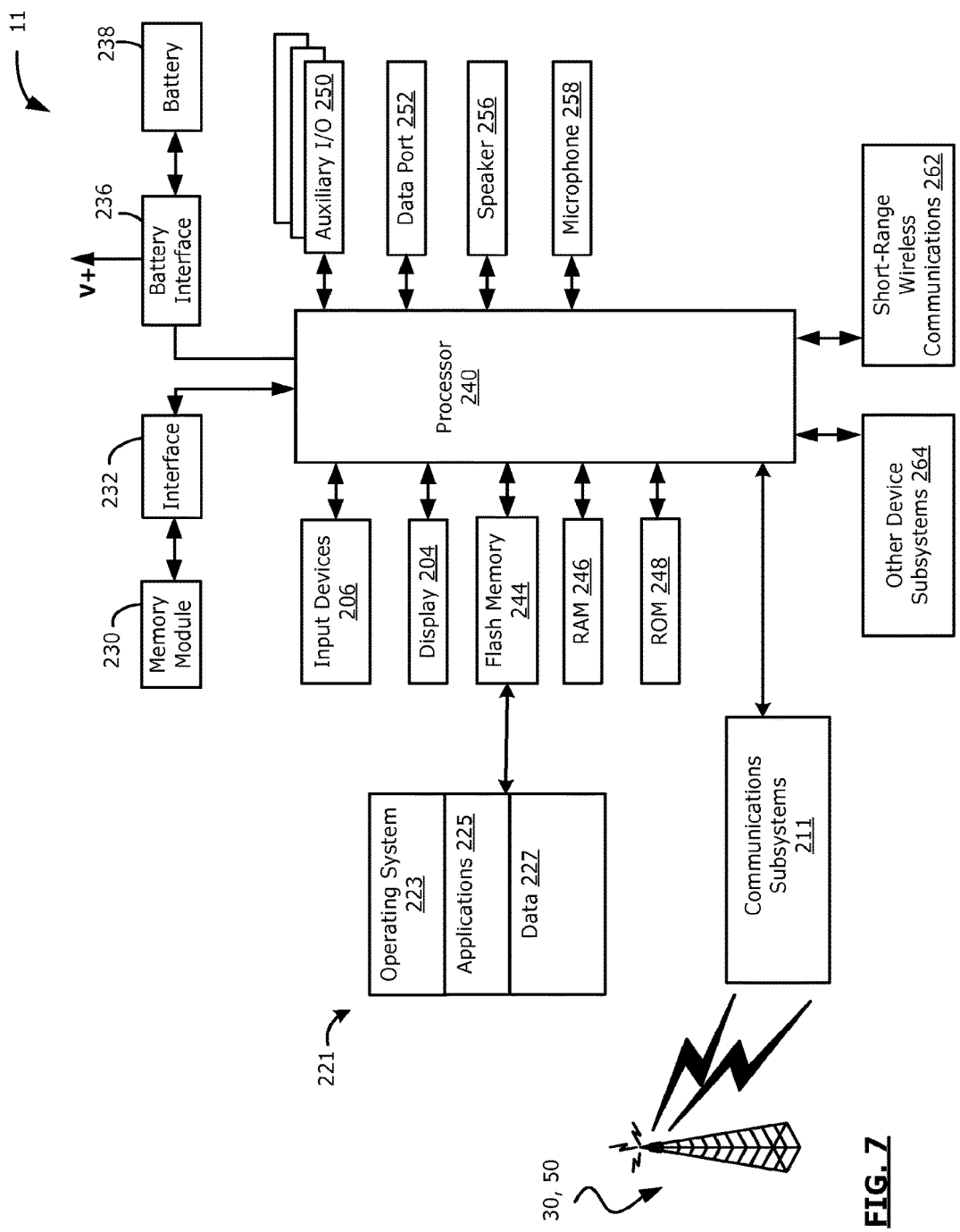
FIG. 7 shows a block diagram illustrating a mobile communication device in accordance with an example embodiment.

Reference is now made to FIG. 7 which illustrates in detail a mobile device 11 in which example embodiments can be applied. The mobile device 11 is a two-way communication device having data and voice communication capabilities, and the capability to communicate with other computer systems, for example, via the Internet. Depending on the functionality provided by the mobile device 11, in various embodiments the mobile device 11 may be a handheld device, a multiple-mode communication device configured for both data and voice communication, a smartphone, a mobile telephone or a PDA (personal digital assistant) enabled for wireless communication.

The mobile device 11 includes a rigid case (not shown) housing the components of the mobile device 11. The internal components of the mobile device 11 may, for example, be constructed on a printed circuit board (PCB). The description of the mobile device 11 herein mentions a number of specific components and subsystems. Although these components and subsystems may be realized as discrete elements, the functions of the components and subsystems may also be realized by integrating, combining, or packaging one or more elements in any suitable fashion. The mobile device 11 includes a controller comprising at least one processor 240 (such as a microprocessor) which controls the overall operation of the mobile device 11. The processor 240 interacts with device subsystems such as a wireless communication subsystem 211 for exchanging radio frequency signals with the wireless network (e.g. WAN 30 and/or PLMN 50) to perform communication functions. The processor 240 interacts with additional device subsystems including a display 204 such as a liquid crystal display (LCD) screen or any other appropriate display, input devices 206 such as a keyboard and control buttons, persistent memory 244, random access memory (RAM) 246, read only memory (ROM) 248, auxiliary input/output (I/O) subsystems 250, data port 252 such as a conventional serial data port or a Universal Serial Bus (USB) data port, speaker 256, microphone 258, short-range communication subsystem 262 (which may employ any appropriate a wireless (e.g., RF), optical, or other short range communications technology), and other device subsystems generally designated as 264. Some of the subsystems shown in FIG. 2 perform communication-related functions, whereas other subsystems may provide "resident" or on-device functions.

Display 204 may be realized as a touch-screen display in some embodiments. The touch-screen display may be constructed using a touch-sensitive input surface connected to an electronic controller and which overlays the visible element of display 204. The touch-sensitive overlay and the electronic controller provide a touch-sensitive input device and the processor 240 interacts with the touch-sensitive overlay via the electronic controller.

The wireless communication subsystem 211 includes one or more communication systems for communicating with wireless WAN base stations 30 and wireless LAN access points 32 within the wireless network. The particular design of the wireless communication subsystem 211 depends on the wireless network in which mobile device 11 is intended to operate. The mobile device 11 may send and receive communication signals over the wireless network after the required network registration or activation procedures have been completed.

The processor 240 operates under stored program control and executes software modules 221 stored in memory such as persistent memory 244 or ROM 248. The processor 240 can execute code means or instructions. ROM 248 may contain data, program instructions or both. Persistent memory 244 may contain data, program instructions or both, in some embodiments is rewritable under control of processor 240, and may be realized using any appropriate persistent memory technology, including EEPROM, EAROM, FLASH, and the like. As illustrated in FIG. 2, the software modules 221 comprise operating system software 223 and software applications 225.

Software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 225 may further include a range of applications, including, for example, an e-mail messaging application, address book, calendar application, notepad application, Internet browser application, voice communication (i.e., telephony) application, mapping application, or a media player application, or any combination thereof. Each of the software applications 225 may include layout information defining the placement of particular fields and graphic elements (e.g., text fields, input fields, icons, etc.) in the user interface (i.e., the display 204) according to the application.

The modules 221 may further include a security module or application which is configured for operating the device 11 in a locked state or an unlocked state. In the locked state, typically numerous functions of the device 11 are restricted, for example to prevent other users from accessing the device 11 or to prevent accidental typing or dialing out from the keyboard. For example, access to at least some applications such as e-mail, web browsing, or media player may be restricted from the device 11. The device 11 would typically need to be unlocked for subsequent operation of the device 11, for example by entering a password or other user identifier. In some example embodiments, the device 11 may be unlocked by typing in a non-random specified keyboard sequence such as ASTERISK (*) SEND, or the like.

The modules 221 may further include a Global Positioning System (GPS) module or application which is configured for detection of a geographical position of the device 11, for example by correlating existing satellites. The GPS module may also receive from the enterprise communications platform 14 the geographical positions of the other devices 11.

In some embodiments, the auxiliary input/output (I/O) subsystems 250 may comprise an external communication link or interface, for example, an Ethernet connection. The auxiliary I/O subsystems 250 may further comprise one or more input devices, including a pointing or navigational tool such as a clickable trackball or scroll wheel or thumbwheel, or one or more output devices, including a mechanical transducer such as a vibrator for providing vibratory notifications in response to various events on the mobile device 11 (e.g., receipt of an electronic message or incoming phone call), or for other purposes such as haptic feedback (touch feedback).

In some embodiments, the mobile device 11 also includes one or more removable memory modules 230 (typically comprising FLASH memory) and one ore more memory module interfaces 232. Among possible functions of the removable memory module 230 is to store information used to identify or authenticate a user or the user's account to wireless network (e.g. WAN 30 and/or PLMN 50). For example, in conjunction with certain types of wireless networks, including GSM and successor networks, the removable memory module 230 is referred to as a Subscriber Identity Module or SIM. The memory module 230 is inserted in or connected to the memory module interface 232 of the mobile device 11 in order to operate in conjunction with the wireless network.

The mobile device 11 stores data 227 in a persistent memory 244. In various embodiments, the data 227 includes service data comprising information required by the mobile device 11 to establish and maintain communication with the wireless network (e.g. WAN 30 and/or PLMN 50). The data 227 can also include, for example, scheduling and connection information for connecting to a scheduled conference call.

The mobile device 11 also includes a battery 238 which furnishes energy for operating the mobile device 11. The battery may be coupled to the electrical circuitry of mobile device 11 through a battery interface 236, which may manage such functions as charging the battery from an external power source (not shown) and the distribution of energy to various loads within or connected to the mobile device 11. Short-range communication subsystem 262 is an additional optional component which provides for communication between the mobile device 11 and different systems or devices, which need not necessarily be similar devices. For example, the short-range communication subsystem 262 may include an infrared device and associated circuits and components, or a wireless bus protocol compliant communication mechanism such as a BLUETOOTH communication module to provide for communication with similarly-enabled systems and devices.

A predetermined set of applications that control basic device operations, including data and possibly voice communication applications will normally be installed on the mobile device 11 during or after manufacture. Additional applications and/or upgrades to the operating system software 223 or software applications 225 may also be loaded onto the mobile device 11 through the wireless network (e.g. WAN 30 and/or PLMN 50), the auxiliary I/O subsystem 250, the data port 252, the short-range communication subsystem 262, or other suitable subsystem such as 264. The downloaded programs or code modules may be permanently installed, for example, written into the program memory (e.g., the persistent memory 244), or written into and executed from the RAM 246 for execution by the processor 240 at runtime.

The mobile device 11 may provide two principal modes of communication: a data communication mode and an optional voice communication mode. In the data communication mode, a received data signal such as a text message, an e-mail message, Web page download, or an image file will be processed by the wireless communication subsystem 211 and input to the processor 240 for further processing. For example, a downloaded Web page may be further processed by a browser application or an e-mail message may be processed by an e-mail message messaging application and output to the display 204. A user of the mobile device 11 may also compose data items, such as e-mail messages, for example, using the input devices in conjunction with the display 204. These composed items may be transmitted through the wireless communication subsystem 211 over the wireless network (e.g. WAN 30 and/or PLMN 50). In the voice communication mode, the mobile device 11 provides telephony functions and operates as a typical cellular phone.

Generally, in some example embodiments, at the time of a conference call, or a specified time beforehand, the locked device 11 may display a prompt that shows that a conference call is starting. This prompt may allow the user to join or snooze the scheduled conference call. If the user elects to join the conference call, the device 11 may further require password entry to unlock the device 11. Once unlocked, the device 11 may then contact the enterprise communications platform 14, for joining of the conference call.

Figure 8:
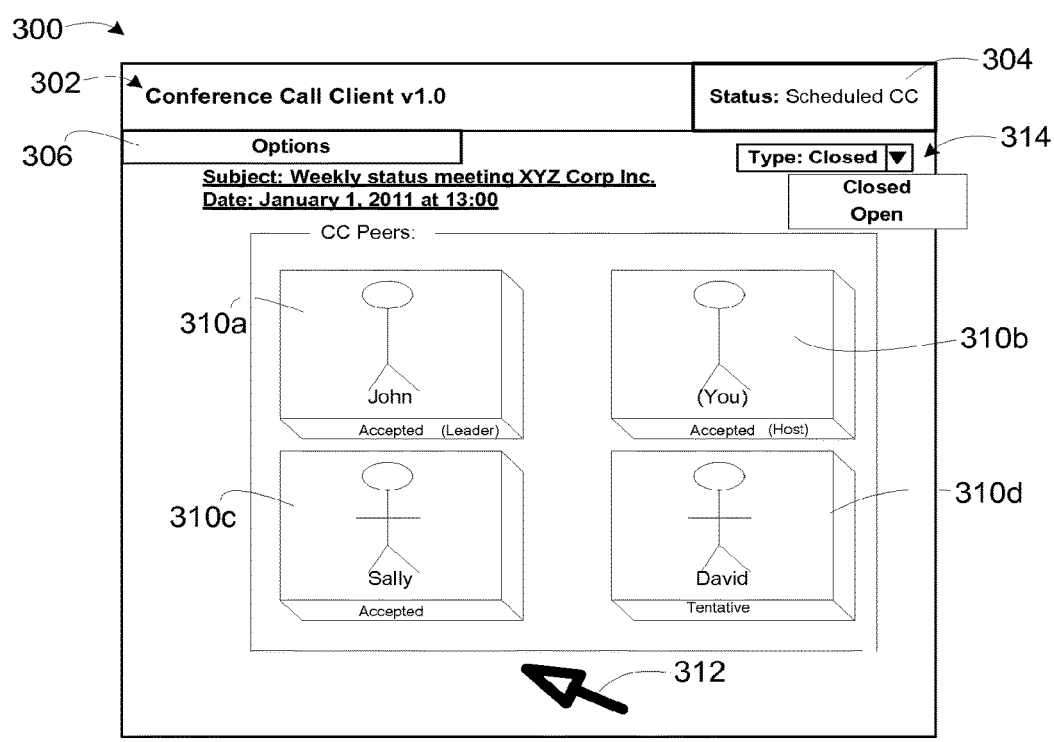
FIG. 8 shows a user interface as displayed on a mobile communication device, for scheduling of a conference call, in accordance with an example embodiment.

Reference is now made to FIG. 8, which shows a user interface 300 displayed on the display 204 for scheduling a conference call, in accordance with an example embodiment. In the example embodiment shown, the user interface 300 is for example implemented by a conference call application (as a stand-alone or in combination with other applications) resident on the mobile device 11 for specifically communicating with the enterprise communications platform 14. The user interface 300 may form part of a conference call session scheduling process.

Still referring to FIG. 8, the user interface 300 relates to scheduling of a conference call session having a subject and which is to occur at a scheduled time and date. For example, the time and date of the schedule conference call session may be stored within the conference call application or a calendar application. For example, the scheduled conference call has a subject field of "Weekly status meeting XYZ Corp Inc." and has a scheduled date field of "Jan. 1, 2011 at 13:00". The user interface 300 may be manually triggered by launching and subsequently operating the conference call application.

As shown in FIG. 8, the user interface 300 also includes an options menu 306 to perform functions such as editing the existing scheduled conference call, scheduling new conference calls, and inviting new participants. Conference call scheduling information is sent from the device 11 to the enterprise communications platform 14, which stores the information in a memory and sends an invitation message to the specified participants with the conference call scheduling information.

At the time of the scheduled conference call, or a specified time beforehand, the enterprise communications platform 14 may contact each of the devices 11 to join the media sessions together. In example embodiments, the devices 11 may also dial or link into the enterprise communications platform 14 using dialing or address link information received during scheduling.

As shown in FIG. 8, the user interface 300 includes a title bar 302, a status icon 304, an options menu 306, and participant icons (each or individually 310) which represent the status of each participant for the conference call. The participant icons 310 can, for example, be a photo or avatar of the individual. A cursor 312 is also shown for indicating which item(s) on the user interface 300 are to be selected (e.g., controllable by a user input device such as a touchscreen, touch scrollball or mouse). The status icon 304 displays the present status of the conference call, for example "Scheduled CC" (Conference Call) as shown.

Referring now to the participant icons 310, in the example shown, the user interface 300 is displayed on the host device 11a, indicated as "You—Host" as shown in icon 310b. Another participant icon 310a can be designated as the leader device 11, typically for the participant individual who will be doing the majority of the speaking, for example "John—Leader" as shown. The remaining participant icons 310c, 310d represent additional participant devices 11 ("Sally" and "David", respectively, as shown). Contact information such as e-mail address or phone number for the participants can be pre-stored in association with the participant names (or can be manually entered, as appropriate). The status of each participant icon 310 can also be shown, for example, as Accepted, Tentative, or Declined.

As shown in FIG. 8, in some example embodiments the host device 11a can also select a menu 314 to designate the scheduled conference call as a "closed" conference call. In a "closed" call, only the specified or eligible participant devices 11 designated by the host device 11a may join the call. In some example embodiments, in a "closed" call further authentication of those participant devices 11 may be performed when attempting to access the scheduled conference call. As shown, the host device 11a also has the option to use the menu 314 to set the scheduled conference call as an "open" conference call, wherein any participant device 11 (designated as eligible or not) may join.

Generally, in some example embodiments, as part of the conference call session scheduling process, after the conference call scheduling information is configured by the host device 11a, the enterprise communications platform 14 subsequently communicates with each device 11 for inviting to the scheduled conference call and for provisioning at least some of the conference call scheduling information. Each device 11 has an option to Accept, Decline, or Tentative. If the device 11 selects Accept, this means that the device 11 will participate in the scheduled conference call. If the device 11 selects Decline, for example, the host device 11a is notified by the enterprise communications platform 14 that the scheduled conference call has been declined by the particular device 11. The notification may be made by phone call, data message, email, etc. If the host device 11a Declines, then the entire scheduled conference call may be cancelled and the other devices 11 notified accordingly. If the device 11 selects Tentative, then the enterprise communications platform 14 notifies the host device 11a accordingly.

Figure 9:
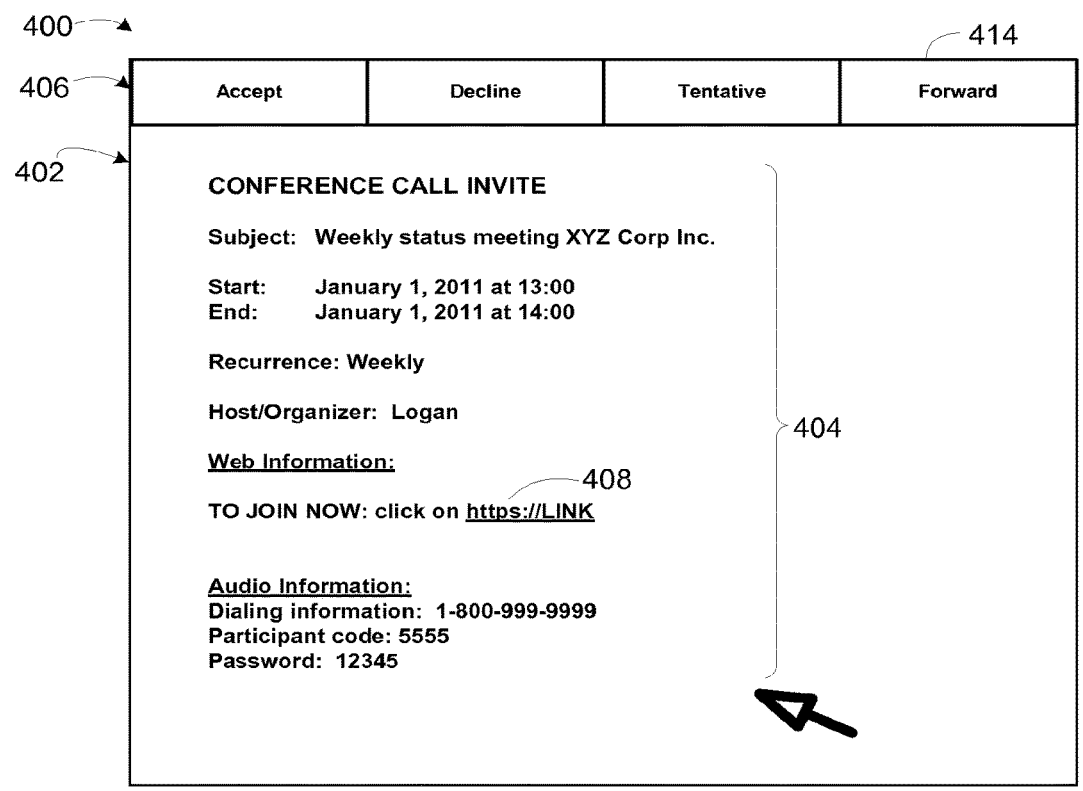
FIG. 9 shows a user interface for displaying a received invitation message on a mobile communication device, in accordance with an example embodiment.

Thus, reference is now made to FIG. 9, which shows a user interface 400 for displaying a received invitation message 402 on a non-host participant device 11. The device 11 first receives the invitation message 402 from the enterprise communications platform 14 with respect to a scheduled conference call. As shown, the message 402 as displayed can include a number of fields 404 which relate to conference call scheduling information. The fields 404 include Subject, Start time, End time, Recurrence, Host/Organizer, Web Information, and Audio Conference Information.

The invitation message 402 may be received as an e-mail message designating the participant's e-mail address, but can also be in other forms such as short message service (SMS), SIP message, instant messaging, or calendar invite. Note that, in other example embodiments, the message 402 may alternatively be received directly or indirectly from the host device 11a, rather than from the enterprise communications platform 14.

As shown on the interface 400, a number of response options 406 may be selected in order to respond to the invitation message 402. As shown, the response options 406 include Accept, Tentative, or Decline, as described above. Upon selection, the response is sent to the enterprise communications platform 14. In further example embodiments, selection of the Accept option may result in the details of the invitation message 402 being stored in a calendar application of the device 11. As shown, the response options 406 can also include an option to Forward 414 to a new participant client device. In some example embodiments, the Forward 414 function can be restricted depending on whether the new participant client device is permitted to join the conference call (for a closed call).

As shown in FIG. 9, the invitation message 402 also includes Web Information which includes an option to select an address link 408 to activate a "Join Now" or "Meet Now" function. At the scheduled date and time of the conference call, the device 11 may receive a user input selecting the address link 408 to request joining the conference call session. If the conference call is a closed call, the enterprise communications platform 14 may then authenticate the device 11, for example by authenticating the particular persistent device identifier of the device 11. Upon authentication, a conference call session can be established between the device 11 and the enterprise communications platform 14, which can include a media session 126 (FIG. 6).

As can be appreciated, in some example embodiments the address link 408 identifies the enterprise communications platform 14 as well as the scheduled conference call session, and can include a Uniform Resource Locator (URL), a Uniform Resource Identifier (URI), or other suitable address.

Figure 10:
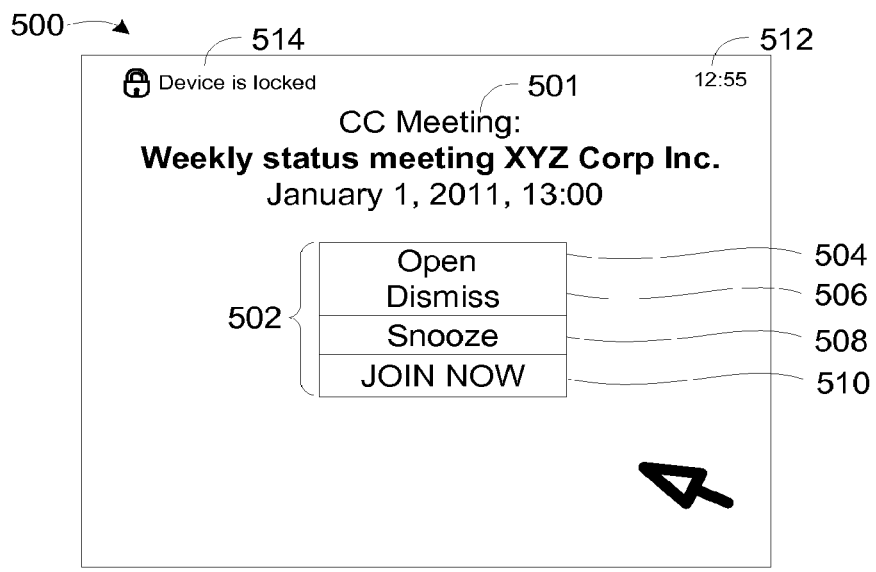
FIG. 10 shows an example user interface displayed on a locked mobile communication device in accordance with an example embodiment.

Reference is now made to FIG. 10, which shows an example user interface 500 displayed on the display 204 of a mobile communication device 11 in accordance with an example embodiment. Generally, in some example embodiments, the interface 500 may display a notification 501 while the device 11 is in a locked state that shows that a conference call is starting now, along with corresponding conference call scheduling information. This interface 500 may allow the user to provide instructions to the device 11 while locked to join the scheduled conference call.

Referring to FIG. 7, the memory 244 may contain the conference call scheduling information in relation to the scheduled conference call. Referring again to FIG. 10, the details in the notification 501 can be retrieved from the memory 244 for display within the interface 500.

Referring again to FIG. 10, in example embodiments, the interface 500 may be displayed at the scheduled time of the conference call, wherein the scheduled time is known from the conference call scheduling information stored in the memory 244 (FIG. 7). In other example embodiments, the interface 500 may be displayed at a specified time prior to the schedule time of the conference call, for example five minutes prior. The current time is indicated by time icon 512.

As indicated by locked icon 514, the device 11 may be in a locked state. If this is the case, the device 11 is configured to still display the interface 500 so as to "break through" the locked state, so as to alert the user while in the locked state. The displaying of the interface 500 may be accompanied by outputting an additional alert through the device 11, for example an audible ringtone, a vibration, or a flashing LED (light emitting diode), etc.

As shown in FIG. 10, the interface 500 includes a number of user-selectable options 502 in relation to the scheduled conference call. The options 502 include open 504, dismiss 506, snooze 508, and join now 510. Selection of dismiss 506 dismisses the notification for the scheduled conference call. In other words, the interface 500 is no longer displayed. Selection of snooze 508 causes the interface 500 to no longer be displayed, but will be re-displayed after a specified period of time, for example five minutes. In either case, if the device 11 is in a locked state, the device 11 remains in the locked state.

Selection of open 504 will open the conference call scheduling information with respect to the subject scheduled conference call. Referring to FIG. 9, for example, the interface 400 may be displayed in response. Alternatively, a corresponding calendar event record (not shown) may be displayed. The user may then join the scheduled conference call by selecting the address link 408 or by following the Audio Conference Information. In some example embodiments, should a device password be required, an additional device password may be required to be entered to unlock the device 11 along with selection of the open 504 option.

Referring again to FIG. 10, selection of the join now 510 option instructs the device 11 to join the conference call by contacting the enterprise communications platform 14, with the connection information obtained from the conference call scheduling information stored in the memory 244. In some example embodiments, should a device password be required, an additional device password may be required to be entered to unlock the device 11 along with selection of the join now 510 option.

Figure 11:
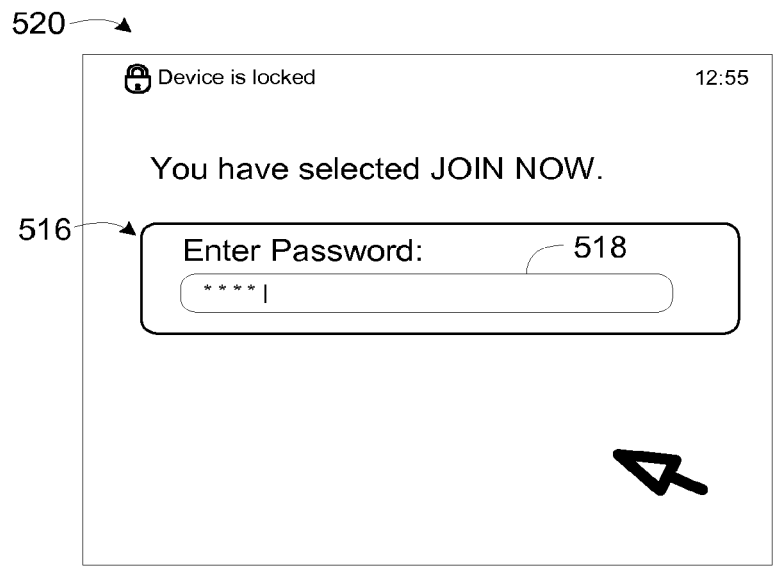
FIG. 11 shows an example user interface with a join now option selected, in accordance with an example embodiment.

Thus, reference is now made to FIG. 11, wherein selection of the join now 510 option results in a second interface 520 being displayed. The second interface 520 includes a password interface 516. As shown, the password interface 516 includes a field 518 for entering of the device password. After input of the device password, the user can select ENTER or other suitable selection or clicking mechanism. In response, the device 11 authenticates the device password and unlocks the device 11 if successful. The device 11 then automatically implements the join now function by automatically sending a communication to the enterprise communications platform 14, for establishing the conference call session. The enterprise communications platform 14 then answers the communication and authenticates the device 11, and a conference call session is thereafter established with the device 11. The authentication may be made by using a persistent device identifier of the device 11. Further, if the conference call is a closed call, the device 11 may be authenticated by the enterprise communications platform 14 by checking a whitelist of permissible devices. In other example embodiments, the device 11 contacts another participant device such as the host device, and directly or indirectly establishes a conference call session with that device.

Referring briefly to FIG. 9, when sending the communication to the enterprise communications platform 14, the device 11 can automatically connect to the link contained in the address link 408 or by following the Audio Conference Information (e.g., by dialing the telephone number and providing the conference password). Further, the device 11 may be authenticated by checking the conference password (if dialing in).

It can be appreciated that in example embodiments which authenticate using the device identifier, the identifier is unique for a mobile device and unique to the associated user. A deskphone, for example, is typically not personal to a user as anyone could sit at a desk and attempt to join a conference call. However, it is uncommon for a user to have a mobile device and join a conference call from a different mobile device of a different user; or for a different user attempt to join a conference call using an authorized mobile device.

In some example embodiments, a specified key sequence such as ASTERISK (*) SEND may be used to unlock the device to prevent accidental launching of the join now feature and dialing into the conference call.

Figure 12:
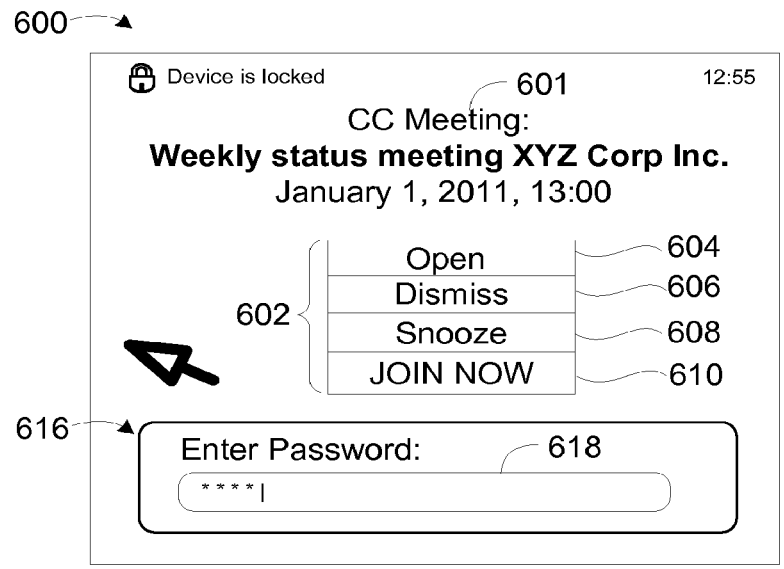
FIG. 12 shows another user interface displayed on a locked mobile communication device in accordance with another example embodiment.

Reference is now made to FIG. 12, which shows another user interface 600 displayed on a locked mobile communication device 11 in accordance with another example embodiment. The interface 600 may display a notification 601 while the device 11 is in a locked state that shows that a conference call is starting, along with corresponding conference call scheduling information. The interface 600 may allow the user to provide instructions to the device 11 while locked to join the scheduled conference call.

As shown in FIG. 12, the interface 600 includes a number of user-selectable options 602 in relation to the scheduled conference call. The options 602 include open 604, dismiss 606, snooze 608, and join now 610. The interface 600 also includes a password interface 616, which includes a field 618 for entering of a device password. After input of the device password, the device 11 in response authenticates the device password and unlocks the device 11. If the join now 610 option is selected, the device 11 then automatically sends a communication to the enterprise communications platform 14, for establishing the conference call session. If the open 604 option is selected, the device 11 displays an interface for displaying the conference call scheduling information.

Figure 13:
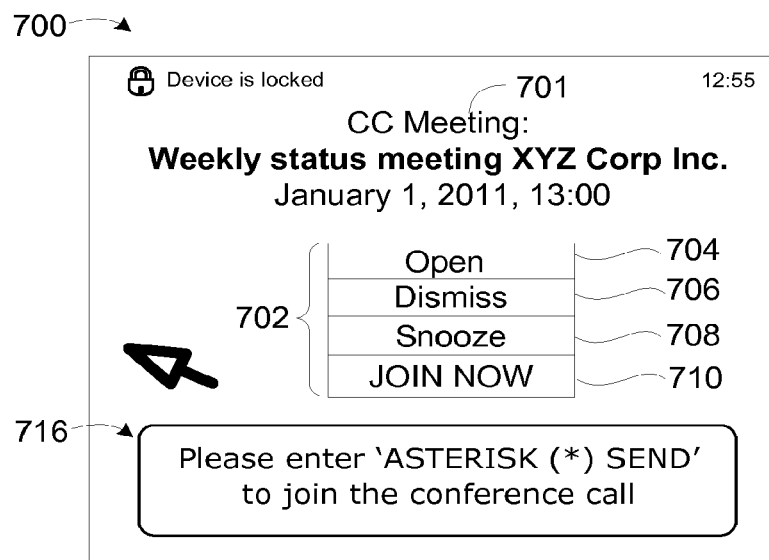
FIG. 13 shows another user interface displayed on a locked mobile communication device in accordance with another example embodiment.

Reference is now made to FIG. 13, which shows another user interface 700 displayed on a locked mobile communication device 11 in accordance with another example embodiment. In the example embodiment shown, an additional specified key sequence is required to prevent accidental joining. The interface 700 may display a notification 701 while the device 11 is in a locked state that shows that a conference call is starting, along with corresponding conference call scheduling information. The interface 700 may allow the user to provide instructions to the device 11 while locked to join the scheduled conference call.

As shown in FIG. 13, the interface 700 includes a number of user-selectable options 702 in relation to the scheduled conference call. The options 702 include open 704, dismiss 706, snooze 708, and join now 710. The interface 600 also includes a popup prompt interface 716 which is displayed in response to selection of one of the options, such as join now 710. As shown, the popup prompt interface 716 includes a prompt to for an additional specified key sequence to be input, which may be required to prevent accidentally joining. For example and without limitation, the prompt interface 716 may display the prompt to "Please enter 'ASTERISK (*) SEND' to join the conference call". An input field (not shown) may also be provided to, for example, receive a specified alphanumeric input such as a basic keyword. After input of the specified key sequence, the device 11 in response unlocks the device 11. If the join now 710 option is selected, the device 11 then automatically sends a communication to the enterprise communications platform 14, for establishing the conference call session. If the open 704 option is selected, the device 11 displays an interface for displaying the conference call scheduling information.

Figure 14:
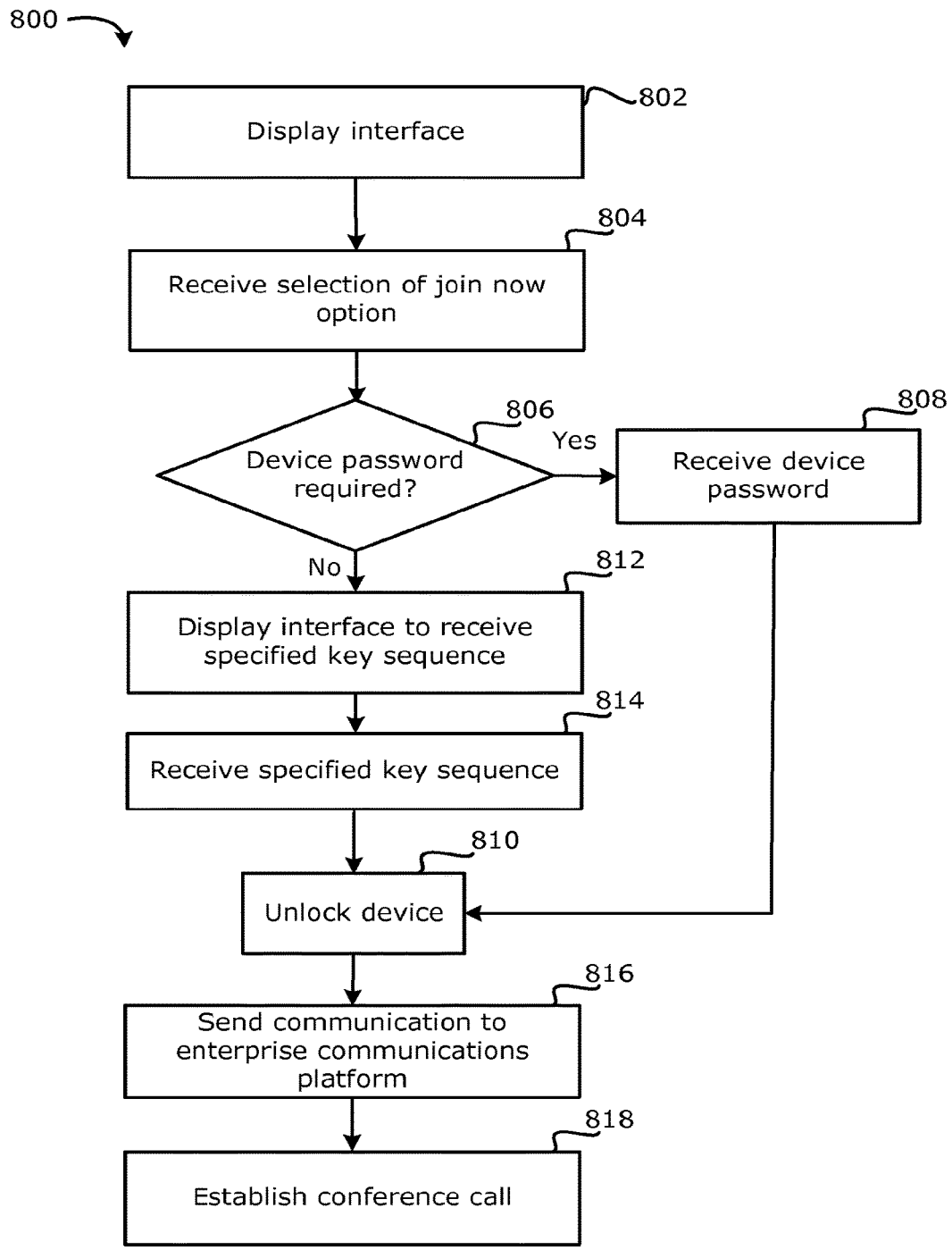
FIG. 14 shows an example flow diagram of a method for joining a conference call in accordance with an example embodiment.

Reference is now made to FIG. 14, which shows an example flow diagram 800 of a method for joining a conference call in accordance with an example embodiment. Reference is also made to the example interface 500 shown in FIG. 10 and the second interface 520 shown in FIG. 11. The method shown in FIG. 13 is for joining a conference call from a communication device 11, the communication device 11 configured for being in a locked state or an unlocked state. The memory 244 of the device 11 may include conference call scheduling information with respect to a scheduled conference call, for example an address link or audio information for communicating with the enterprise communications platform 14. At step 802, the method displays an interface 500 on the communication device 11 while the communication device 11 is in the locked state. The interface 500 includes an option to join a scheduled conference call, shown as join now 510 (FIG. 10). At step 804, by way of a user input device, the device 11 receives an input for selection of the join now 510 option while the communication device 11 is in the locked state. At step 806, it is determined whether a device password is required to unlock the device 11. If so (if "yes"), the flow diagram 800 proceeds to step 808 for receiving the device password. This includes displaying a password interface 516. The flow diagram 800 then proceeds to step 810 to unlock the device 11 to the unlocked state. In some example embodiments, if a password is not required (if "no"), at step 812 an interface (e.g. interface 716 FIG. 13) may be displayed which prompts for an additional specified key sequence to be input, which may be required to prevent accidentally joining. For example and without limitation, the interface may display the prompt to "Please enter 'ASTERISK (*) SEND' to join the conference call". At step 814, the specified key sequence is received via user input. The flow diagram 800 then proceeds to step 810 to unlock the device 11.

At step 816, in response to the selection of the join now 510 option, the device 11 sends a communication to the enterprise communications platform 14 for establishing a conference call session, using the contact information stored in memory 244. At step 818, the enterprise communications platform 14 answers the communication and establishes a conference call session with the device 11.

In some other example embodiments, at step 806 if a password is not required (if "no"), the flow diagram 800 may proceed directly (not shown) to step 810 to unlock the device 11, without the specified key sequence prompt.

Referring still to the flow diagram 800 of FIG. 14, note that, a similar process can be followed with respect to the interface 600 shown in FIG. 12. For example, the password interface 616 would be included within the same interface 600 having the join now 610 option.

It can be appreciated that the specific words as shown in the various user interfaces are intended to be illustrative only. For example, any suitable words or phrases may be used, and would not be limited to the English language. For example, any number of multi-lingual variations in different languages may be displayed or output from the device.

Variations of the above example methods may be used. While some of the above examples have been described as occurring in a particular order, it will be appreciated to persons skilled in the art that some of the messages or steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps of the conversations may be repeated, as necessary. Elements described as methods or steps similarly apply to systems or subcomponents, and vice-versa.

For example, referring to FIG. 10, the displaying of the join now 510 option is not limited to the words "JOIN NOW", but can be any suitable text such as "MEET NOW". In other example embodiments, the join now 510 option displays the actual link address (e.g. URL address) of the enterprise communications platform 14 for joining the conference call.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the present disclosure, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method for joining a conference call from a communication device, the communication device having a locked state and an unlocked state, the method comprising:
    displaying an interface on the communication device while the communication device is in the locked state, the interface including an option to display information of a scheduled conference call;

receiving an input for selection of the option while the communication device is in the locked state;

in response to the selection of the option for displaying information of the scheduled conference call, determining if a device password is needed to unlock the communication device;

in response to determining that the device password is not needed to unlock the communication device, displaying an instruction requesting an input of a specified key sequence, wherein the instruction includes the specified key sequence and the specified key sequence is different than the device password or a password of the conference call;

in response to receiving the specified key sequence, unlocking the communication device to the unlocked state;

in response to unlocking the communication device, displaying the information of the scheduled conference call, the display information including a link to the scheduled conference call, wherein selection of the link is configured to initiate an outgoing Voice over Internet Protocol (VoIP) call using an internet address;

receiving a second input for selection of the link; and sending, in response to the selection of the link, an outgoing VoIP communication to a conference server for establishing a conference call session.

2. The method of claim 1 wherein the communication device includes a memory for storing conference call scheduling information, wherein said sending includes automatically retrieving contact information of the conference server from the conference call scheduling information.

3. The method of claim 1 wherein the instruction requesting the input of the specified key sequence is displayed on a second interface in response to receiving the input.

4. The method of claim 1 wherein the instruction requesting the input of the specified key sequence is displayed within the interface.

5. The method of claim 1 wherein the specified key sequence is an asterisk (*).

6. The method of claim 1 wherein the conference server authenticates the communication device based on an identifier of the communication device.

7. The method of claim 1 wherein the conference server answers the communication in response, the method further comprising establishing the conference call session.

8. The method of claim 1 wherein the displaying is performed at a specified time prior to a time of the scheduled conference call.

9. The method of claim 1 further comprising outputting an alert through the communication device when displaying the interface.

10. A communication device comprising:
a controller configured for operating the communication device in a locked state or an unlocked state;
a communications subsystem;
a display configured for displaying an interface on the communication device while the communication device is in the locked state, the interface including an option to display information of a scheduled conference call; and
an input device configured for receiving an input for selection of the option while the communication device is in the locked state;
wherein the controller is further configured for:

in response to the selection of the option for displaying information of the scheduled conference call, determining if a device password is needed to unlock the communication device;

in response to determining that the device password is not needed to unlock the communication device, displaying an instruction requesting an input of a specified key sequence, wherein the instruction includes the specified key sequence and the specified key sequence is different than the device password or a password of the scheduled conference call; and in response to receiving the specified key sequence, unlocking the communication device to the unlocked state, wherein the display is further configured for, in response to unlocking the communication device, displaying the information of the scheduled conference call, the display information including a link to the scheduled conference call, and selection of the link configured to initiate an outgoing Voice over Internet Protocol (VoIP) call using an internet address;

wherein the input device is further configured for receiving a second input for selection of the link; and the controller is further configured for sending, in response to the selection of the link, an outgoing VoIP communication to a conference server for establishing a conference call session.

11. The communication device of claim 10 further comprising a memory for storing conference call scheduling information, wherein said sending includes automatically retrieving contact information of the conference server from the conference call scheduling information.

12. The communication device of claim 10 wherein the instruction requesting the input of the specified key sequence is displayed on a second interface in response to receiving the input.

13. The communication device of claim 10 wherein the instruction requesting the input of the specified key sequence is displayed within the interface.

14. The communication device of claim 10 wherein the specified key sequence is an asterisk (*).

15. The communication device of claim 10 wherein the conference server authenticates the communication device based on an identifier of the communication device.

16. The communication device of claim 10 wherein the conference server answers the communication in response, the controller being further configured for establishing the conference call session.

17. The communication device of claim 10 further comprising outputting an alert through the communication device when displaying the interface.

18. A non-transitory computer readable medium storing instructions that, when executed by a communication device, cause the communication device to perform a method for joining a conference call, the method comprising:

displaying an interface on the communication device while the communication device is in a locked state, the interface including an option to display information of a scheduled conference call;

receiving an input for selection of the option while the communication device is in the locked state;

in response to the selection of the option for displaying information of the scheduled conference call, determining if a device password is needed to unlock the communication device;

in response to determining that the device password is not needed to unlock the communication device, displaying an instruction requesting an input of a specified key sequence, wherein the instruction includes the specified key sequence and the specified key sequence is different than the device password or a password of the conference call;

in response to receiving the specified key sequence, unlocking the communication device to an unlocked state;

in response to unlocking the communication device, displaying the information of the scheduled conference call, the display information including a link to the scheduled conference call, wherein selection of the link is configured to initiate an outgoing Voice over Internet Protocol (VoIP) call using an internet address;

receiving a second input for selection of the link; and sending, in response to the selection of the link, an outgoing VoIP communication to a conference server for establishing a conference call session.

* * * * *